No Printed Specification Available
5775X
J. H. CONKLIN.
Plow-Point.
Patented Jan. 13, 1830.
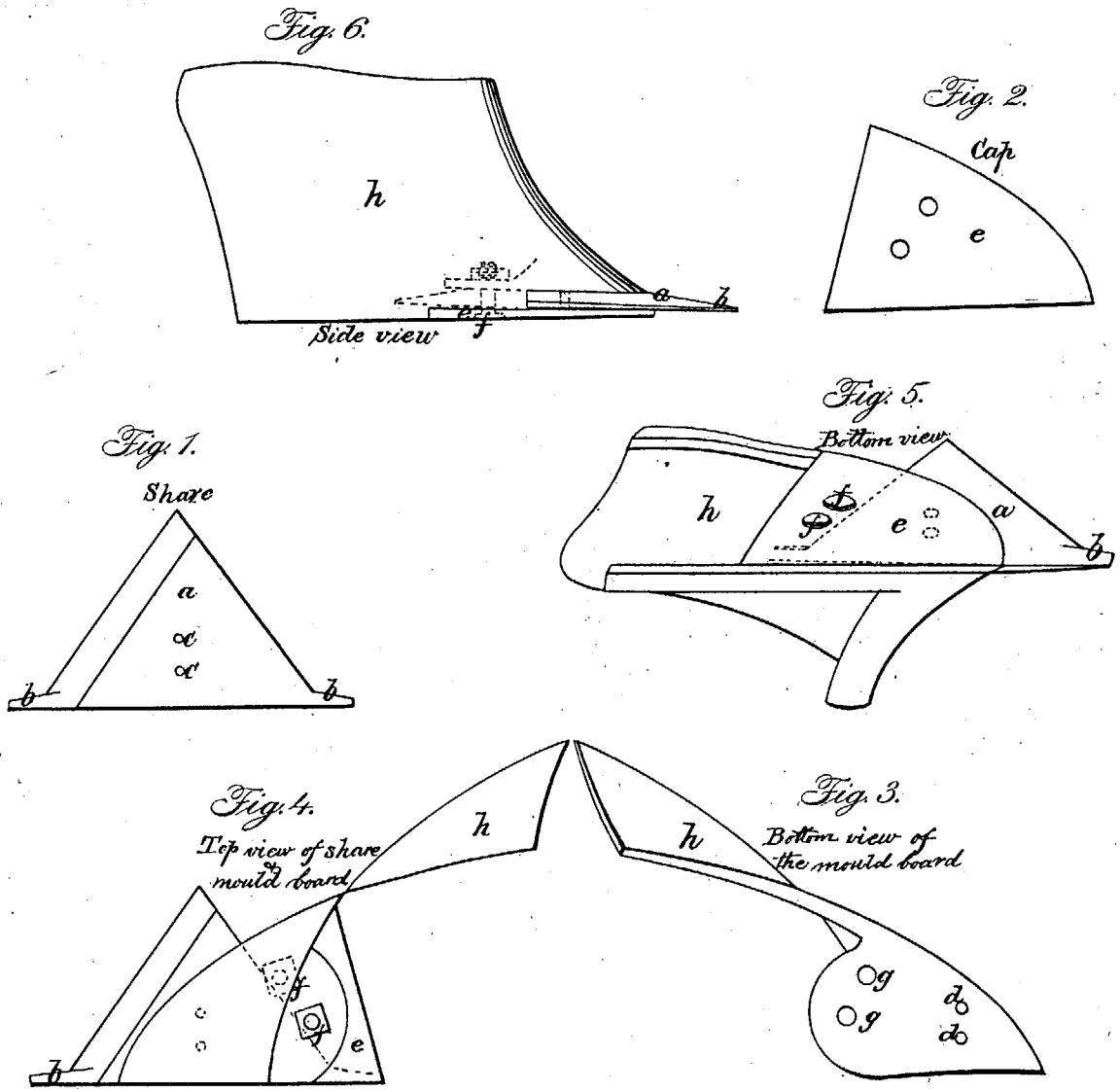
AM. PHOTO-LITHO. CO. N.Y. (OSBORNE'S PROCESS.)

James H. Conklin

5775X

Letters Patent,

The schedule referred to in these letters Patent and making part of the same, containing a description in the words of the said James H. Conklin, himself of his improvement in the Cast Iron ploughshare, The advantage which this ploughshare claims over those now in use, consists of being modeled so as to have two points and two edges, the one of which may be used after the other is worn out, by changing its position on the mould board which being so constructed as to admit of the share being reversed, or changed, one end for the other at pleasure & answers the purposes intended. The share is so made and constructed, as to have the two different edges, when rounded present the same shape & structure, The share is made of cast iron or other firm and durable substance, & the mould board is also to be made of cast iron, or other firm & durable substance, The share is separate & distinct from the mould board; & the manner of fastening it to the mould board is by having two sockets, or mortises in or near the centre of the share which are adapted & fitted to two points or tenons on the mould board, in the place or groove where the said share fits; the said share being so placed on the mould board, as to admit of a cap or confiner to cover one point & edge or one half of the share; the said cap or confiner then extends an equal distance on the mould board & presents a plain and smooth surface, The cap and confiner is then fastened to the mould board by two strong and sufficient screws, or wedges which go through near the centre of said cap, or confiner so as to be strong, firm and steady. When one edge of the share is worn out, then by

X5775 turning it round it presents the reverse edge and point of equal du-
rability, with the other, before it was worn, & the whole being shap
and reversed, as to the respective sides, fits the mould board with
the same firmness by means of the said cap or confiner, with the
mortises and tenons or lockets & pins & screws which all combined
make it strong & durable, —— The mould board is so framed as
to take the one half of the share into a groove or place sunk in the
mould board, formed for that purpose, & for the cap or confiner
likewise. Thus the improved share, serves the purpose of two
common shares & will cost no more than one on the ordina-
-ry plan now in use For a further illustration of my improvement I refer to
the drawing & model of the same deposited in the Patent office

What I claim as my invention or improvement & which I
wish to secure by Letters Patent, is the improvement in the
cast iron plough share, as above described, the share having
two points and two edges which may be reversed at pleasure
thereby serving the purposes of two common shares & costing
no more than one of the ordinary kind, I claim also the
mode of fastening the share to the mould board as before
described —

Harvey H. Conklin

Witnesses

Saml. Ord

L. S. Beck

650 [illegible]